March 3, 1970     B. ZINKGRAF     3,498,525

PACKAGE AND COVER THEREFOR

Filed Jan. 15, 1968

INVENTOR
Bernhard Zinkgraf

Anderson, Luedeka, Fitch, Even, & Tabin
ATTORNEYS

United States Patent Office 3,498,525
Patented Mar. 3, 1970

3,498,525
PACKAGE AND COVER THEREFOR
Bernhard Zinkgraf, Prospect Heights, Ill., assignor to Kraftco Corporation, New York, N.Y., a corporation of Delaware
Filed Jan. 15, 1968, Ser. No. 697,921
Int. Cl. B65d 51/00
U.S. Cl. 229—43               6 Claims

ABSTRACT OF THE DISCLOSURE

A cover of improved strength against tearing is formed by laminating a cast film of polyvinyl chloride to an aluminum foil with a suitable adhesive. An exterior layer of cellophane may be bonded to the foil by an adhesive. The cast film of polyvinyl chloride provides a uniformly thick layer which can be heat sealed to a flange of a container cup, which is usually formed of polyvinyl chloride. Since the cover is strong, it may be peeled from the cup without tearing into pieces which would result in only a portion of the contents of the cup being exposed.

---

This invention relates to packages and more particularly to packages in which a cover is peeled from a container cup.

A typical package with a peelable cover is a so called portion controlled package which is filled with an individual portion or serving of products such as, for example, jelly, margarine, catsup, mustard, cheese, peanut butter or the like. A free edge of the cover is accessible to the consumer who grasps the cover and peels the cover from a flange on the cup. The peeling breaks the hermetic seal usually formed by heat sealing facing materials on the cover and cup. A conventional portion controlled package has a polyvinyl chloride cup and an aluminum foil cover is provided with an outer layer such as cellophane which is easily decorated such as by printing or metallizing. Such polyvinyl chloride cups and aluminum foil laminate covers provide an attractive package and meet the necessary criteria that it be capable of being mass produced and made of relatively inexpensive materials.

Although such portion controlled packages are satisfactory, the covers are subject to breaking or tearing in two, resulting in only a portion of the cover being removed from the cup. While the remaining portion of the cover may be removed by an additional peeling operation or the contents dug out from beneath the adhering cover portion, the tearing of the cover into two pieces is a source of aggravation to the consumer who not only must perform two operations instead of one but also may accidentally contact the contents when peeling the remaining torn portion of the cover from the cup.

Accordingly, a general object of the invention is to provide a non-tearing cover and a low cost, commercially acceptable portion controlled package of the foregoing kind.

Other objects and advantages of the invention will become apparent from the detailed description taken in connection with the accompanying drawings in which.

Figure 1:
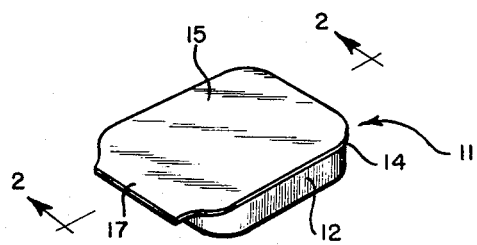
FIGURE 1 is a perspective view of a portion controlled package embodying the invention.
Figure 2:
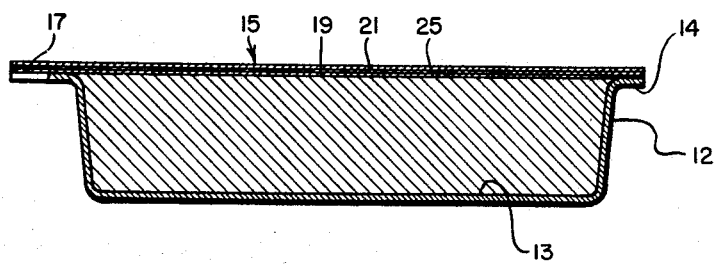
FIGURE 2 is an enlarged sectional view taken along the line 2—2 of FIGURE 1.

As shown in the drawings for purposes of illustration, the present invention is embodied very generally in a portion controlled package 11 having an individual serving container or cup 12 with a central chamber 13 and outwardly turned horizontal flange 14 (FIGURE 2). To provide a hermetic seal for the package, a laminated cover 15 is adhered to the flange 14 by a suitable adhesive or by heat sealing. The cover 15 has increased strength, as contrasted with the prior art, to prevent tearing of the cover as it is grasped at a free edge 17 (FIGURE 1) and peeled from the container 12.

Figure 3:
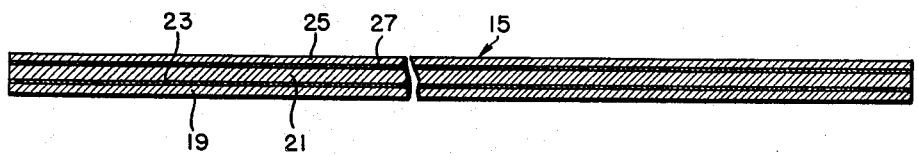
FIGURE 3 is an enlarged, schematic cross sectional view of a laminated cover.

In accordance with the present invention, the cover 15 is not only stronger but is more easily heat sealed to the container while readily peelable therefrom without tearing into separate pieces and thereby leaving a portion of the contents covered by an adhering portion of the cover. To achieve greater resistance to tearing while providing a heat sealable material the laminated cover is formed with a cast layer 9 (FIGURES 2 and 3) of polyvinyl cloride, preferably about .00075 inch thick adhered to a layer 21 of aluminum foil. The cast layer is continuous and of a realtively uniform thickness as contrasted to a coating which often is discontinuous or often has extremely thin areas which provide insufficient resistance to tearing.

Conventional solution coatings for prior art covers are usually made of a mixture of polyvinyl chloride and polyvinyl alcohol in a solvent such as methyl ethyl ketone or acetone in combination with toluene. The solution is applied as a very thin coating to one face of the aluminum foil and, when the solvent was evaporated, the resulting vinyl polymer coating was of a relatively low molecular weight as contrasted to the higher molecular weight for the cast layer 19 of the present invention. The lower molecular weight coating is, as contrasted with the cast layer 19, more brittle and less strong. It is difficult to obtain a uniform thickness of coating over the aluminum foil and areas of discontinuity have occurred in the coating. The lower strength of coating and its non-uniform thickness contribute to formation of areas of weakness in the laminated cover, which areas are then subject to tearing.

The cup 12 is usually molded from a strip of polyvinyl chloride of about 0.010 to 0.015 inch thick, although other plastics and materials such as aluminum of varying thicknesses may be used. In the case of aluminum, an adhesive or a heat sealable coating is applied to the flange to hermetically seal the cover to it. It is preferred that the seal has a relatively low peel strength of about 1 lb. per lineal inch. The laminate cover 15 will not readily tear before peeling as the tensile or tear strength of the cover 15 is considerably in excess of the peel strength.

A preferred method of making a portion controlled package having the laminated cover 15 is as follows:

A solution of polyvinyl chloride is cast into a thin film having a thickness of about 0.0008 inch to about 0.001 inch when solidifying the polyvinyl chloride with evaporation of a carrier solvent such as methyl (iso) butyl ketone in combination with toluene from the solution. The cast layer 19 is continuous, has a relatively uniform thickness, good strength and is relatively clear. The cast layer 19 is bonded to one face of aluminum foil 21, which is about .00035 inch thick, by an adhesive 23. To provide an outer surface for the cover which is more receptive to printing, metallizing or other decoration than the aluminum foil, a thin cellophane layer 25 of about 0.001 inch thick may be bonded to the outer face of the aluminum foil layer 21 by an adhesive 27.

After the serving is deposited in the chamber 13, the laminated cover 15 is placed on the cup with its polyvinyl chloride layer 19 abutting the cup flange 14. The heat seal bond is then formed between the cast layer 19 and the flange 14 by a suitable application of heat and pressure such as 120 to 180 p.s.i. at a temperature between 270° F. and 300° F. Another advantage of the cast layer 19 over the vinyl coating is that it is possible to use heat sealing temperatures which are higher than 260° F. usually used with solution coatings. Heat sealing pressures may range from about 120 p.s.i. to 180 p.s.i. and the preferred range of pressures is about 150 p.s.i. Thus, the cover 15 eliminates some of the problems of heat sealing prior art covers to a cup.

What is claimed is:

1. A disposable package comprising a cup made of polyvinyl chloride and having an integral, peripheral flange extending outwardly about the upper edge of said cup, and a laminated cover extending across said flange and sealed thereto to provide a seal for said package, said cover being flexible and peelable from said cup and comprising bonded layers from exterior to interior of a foil of aluminum and a cast film of polyvinyl chloride bonded to said aluminum.

2. A package in accordance with claim 1 in which a film of cellophane is bonded to said aluminum foil layer by an adhesive and in which said cast polyvinyl chloride film is bonded to said foil layer by an adhesive.

3. A package in accordance with claim 1 in which said cast polyvinyl chloride film is continuous and is between about 0.00075 to 0.001 inch thick.

4. A laminated cover material for providing a seal with a flange of a packaging cup, said cover material comprising a foil of aluminum and a cast film of polyvinyl chloride bonded to said aluminum foil, said cover material being flexible and peelable from said cup.

5. A cover material in accordance with claim 4 in which a cellophane film is bonded by an adhesive to said aluminum foil and said cast polyvinyl chloride film is bonded to said foil by an adhesive.

6. A cover material in accordance with claim 4 in which said cast polyvinyl chloride film is continuous and is between about 0.00075 to 0.001 inch thick.

References Cited

UNITED STATES PATENTS

| | | | |
|---|---|---|---|
| 1,802,985 | 4/1931 | Semon | 161—220 X |
| 2,470,761 | 5/1949 | Delorme et al. | 161—218 X |
| 2,956,915 | 10/1960 | Korn et al. | 161—218 X |
| 2,983,641 | 5/1961 | McConaughy | 161—218 X |
| 2,993,806 | 7/1961 | Fisher et al. | 161—218 X |
| 3,051,598 | 8/1962 | Chipman et al. | 161—218 X |
| 3,079,057 | 2/1963 | Colarusso | 229—3.5 |
| 3,391,847 | 7/1968 | Christine et al. | 229—43 |

DAVIS T. MOORHEAD, Primary Examiner

U.S. Cl. X.R.

161—218; 229—3.5

UNITED STATES PATENT OFFICE
CERTIFICATE OF CORRECTION

Patent No. 3,498,525                Dated March 3, 1970

Inventor(s) Bernard Zinkgraf

It is certified that error appears in the above-identified patent and that said Letters Patent are hereby corrected as shown below:

Column 1, line 37, after "cover" insert --which is coated with polyvinyl chloride and is heat sealed to the cup. In many instances, the aluminum foil cover--.

Column 2, line 15, correct the spelling of "chloride";

line 17, correct the spelling of "relatively".

SIGNED AND
SEALED
NOV 3 1970

(SEAL)
Attest:

Edward M. Fletcher, Jr.
Attesting Officer

WILLIAM E. SCHUYLER, JR.
Commissioner of Patents